United States Patent
Kikuchi et al.

(10) Patent No.: US 10,421,846 B2
(45) Date of Patent: Sep. 24, 2019

(54) AZEOTROPE-LIKE COMPOSITION COMPRISING Z-1,1,1,4,4,4-HEXAFLUORO-2-BUTENE

(71) Applicant: DUPONT-MITSUI FLUOROCHEMICALS CO. LTD, Tokyo (JP)

(72) Inventors: Hideaki Kikuchi, Shizuoka (JP); Takanori Matsumoto, Shizuoka (JP)

(73) Assignee: DUPONT-MITSUI FLUOROCHEMICALS CO., LTD, Tokyo (JP)

( * ) Notice: Subject to any disclaimer, the term of this patent is extended or adjusted under 35 U.S.C. 154(b) by 0 days.

(21) Appl. No.: 15/777,935

(22) PCT Filed: Dec. 7, 2016

(86) PCT No.: PCT/US2016/065358
§ 371 (c)(1),
(2) Date: May 22, 2018

(87) PCT Pub. No.: WO2017/105959
PCT Pub. Date: Jun. 22, 2017

(65) Prior Publication Data
US 2018/0346677 A1 Dec. 6, 2018

(30) Foreign Application Priority Data

Dec. 14, 2015 (JP) ................ 2015-242867

(51) Int. Cl.
| | | |
|---|---|---|
| *C09K 5/04* | (2006.01) | |
| *C08J 9/14* | (2006.01) | |
| *C11D 7/50* | (2006.01) | |
| *C11D 11/00* | (2006.01) | |

(52) U.S. Cl.
CPC ............ *C08J 9/149* (2013.01); *C08J 9/142* (2013.01); *C08J 9/146* (2013.01); *C09K 5/045* (2013.01); *C11D 7/509* (2013.01); *C11D 11/0047* (2013.01); *C08J 2203/12* (2013.01); *C08J 2203/162* (2013.01); *C08J 2203/182* (2013.01); *C08J 2300/22* (2013.01); *C08J 2300/24* (2013.01); *C09K 2205/102* (2013.01); *C09K 2205/126* (2013.01); *C09K 2205/24* (2013.01); *C09K 2205/32* (2013.01)

(58) Field of Classification Search
CPC ... C08J 9/149; C08J 9/142; C08J 9/146; C08J 2300/24; C08J 2300/22; C08J 2203/182; C08J 2203/162; C08J 2203/12; C11D 11/0047; C11D 7/509; C09K 5/045; C09K 2205/24; C09K 2205/102; C09K 2205/32; C09K 2205/126
USPC .............. 252/67; 510/177, 415, 408; 521/98
See application file for complete search history.

(56) References Cited

U.S. PATENT DOCUMENTS

| | | | | |
|---|---|---|---|---|
| 8,911,640 | B2 * | 12/2014 | Nappa ................... | C09K 5/045 252/67 |
| 2008/0060687 | A1 * | 3/2008 | Schweitzer ............. | C09K 3/30 134/40 |
| 2010/0112328 | A1 * | 5/2010 | Van Horn ................ | C08J 9/146 428/304.4 |
| 2011/0147638 | A1 * | 6/2011 | Robin ................... | A62D 1/0057 252/2 |
| 2012/0004299 | A1 * | 1/2012 | Hulse ................... | A62D 1/0057 514/475 |
| 2016/0137895 | A1 * | 5/2016 | Kontomaris ............. | F25B 7/00 62/114 |
| 2018/0022884 | A1 * | 1/2018 | Bogdan ............... | C08G 18/7621 521/131 |
| 2018/0044567 | A1 * | 2/2018 | Tasaka ................... | C09K 5/04 |
| 2018/0264303 | A1 * | 9/2018 | Robin ................. | A62D 1/0092 |

FOREIGN PATENT DOCUMENTS

| | | |
|---|---|---|
| WO | 2010/151864 A1 | 12/2010 |
| WO | 2011/084447 A2 | 7/2011 |

OTHER PUBLICATIONS

International Search Report and Written Opinion dated Mar. 9, 2017 in PCT/US2016/065358.

\* cited by examiner

*Primary Examiner* — Douglas J McGinty

(57) ABSTRACT

The present invention aims to solve the above mentioned problems by providing a new azeotrope-like composition that can be used for a wide range of industrial purposes. The provision of an azeotrope-like composition including 93.0-99.0 weight percent Z-1,1,1,4,4,4-hexafluoro-2-buteine and 0.1-7 weight percent isopropanol.

5 Claims, 1 Drawing Sheet

AZEOTROPE-LIKE COMPOSITION COMPRISING Z-1,1,1,4,4,4-HEXAFLUORO-2-BUTENE

BACKGROUND INFORMATION

Field of the Disclosure

The present invention relates to an azeotrope-like composition made up of Z-1,1,1,4,4,4-hexafluoro-2-buteine and isopropanol.

Description of the Related Art

To date, halogenated hydrocarbons such as chlorofluorocarbons (CFC), hydrochlorofluorocarbons (HCFC) and hydrofluorocarbons (HFC) have been used within many industries in a wide range of applications, including aerosol propellants, refrigerants, solvents, cleaning agents, thermoplastic and thermosetting foams for foaming agents (foam expansion agents), heat transfer mediums, gaseous dielectrics, fire extinguishing agents and fire suppression agents, power cycle working fluids, polymerization mediums, particulate removal fluids, carrier fluids, buffing abrasive agents, and displacement drying agents.

At the same time, CFCs and HCFCs are known to be ozone damaging substances, while HFCs, although not damaging to the ozone layer, are greenhouse gases which impact global warming. As such, alternative compositions that have a lower environmental impact, in other words, an ozone depletion potential of zero along with extremely low potential in regard to global warming, are now being sought.

Azeotropes, which do not fractionate during vaporization while being used or collected, in other words, have fixed boiling point characteristics, and do not fractionate when boiled or vaporized, are known to be effective as this kind of alternative composition (see, for example, Patent Documents 1, 2 and 3). As noted in Patent Document 1, however, it is not theoretically possible to predict whether or not an azeotrope will be formed, and as such, work is still under consideration regarding combining various substances together in order to seek new azeotropes with excellent characteristics.

SUMMARY

The present invention aims to solve the abovementioned problems by providing a new azeotrope-like composition that can be used for a wide range of industrial purposes.

The inventors of the present invention have discovered that Z-1,1,1,4,4,4-hexafluoro-2-buteine (Z-HFO-1336mzzm), which has an ozone depletion potential of 0, along with a global warming potential of under 10, forms isopropanol (IPA) and an azeotrope, wherein the volume resistivity is furthermore significantly reduced by a small quantity of IPA, thereby arriving at the present invention.

In other words, the present invention has the following characteristics.

1. An azeotrope-like composition including 93.0-99.9 mass % Z-1,1,1,4,4,4-hexafluoro-2-buteine and 0.1-7 mass % isopropanol.
2. A solid-surface cleaning agent including the azeotrope-like composition in 1.
3. The cleaning agent in 2, wherein the solid-surface is a semiconductor surface.
4. A coolant including the azeotrope-like composition in 1.
5. A foaming agent including the azeotrope-like composition in 1.

BRIEF DESCRIPTION OF THE DRAWINGS

Embodiments are illustrated in the accompanying figures to improve understanding of concepts as presented herein.

DETAILED DESCRIPTION

Figure 1:
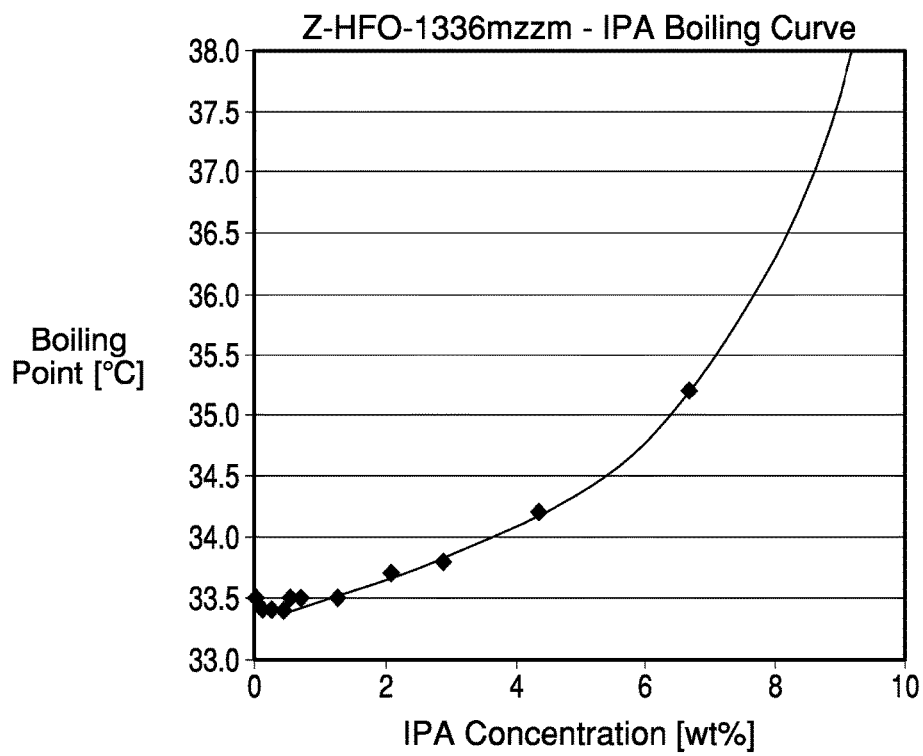
FIG. 1: depicts the boiling curve of the mixture of Z-HFO-1336mzzm and IPA.

The present invention allows the provision of an azeotrope-like composition with an ozone depletion potential of 0, along with an extremely low global warming potential.

The composition in the present invention has low volume resistivity, allowing the adherence or re-adherence of microscopic particles as a result of static electricity to be controlled, ensuring low viscosity and surface tension, as well as high density, with the result that it has high osmotic force and is particularly suited to use as a cleaning agent, particularly a cleaning agent (surface processing agent) for solid surfaces, for example, in the removal of microscopic particles from semiconductor surfaces.

Furthermore, Z-HFO-1336mzzm becomes an azeotrope with the addition of a microscopic quantity of IPA, which is cheap and harmless, and which further significantly reduces volume resistivity, with the result that the azeotrope does not become flammable, and additionally, since only a microscopic quantity of IPA is required, it is possible to limit contamination by moisture in the atmosphere, which is extremely compatible with IPA.

The present invention is an azeotrope-like composition, substantively formed from Z-1,1,1,4,4,4-hexafluoro-2-buteine (Z-HFO-1336mzzm) and isopropanol (IPA). The components within the composition of the present invention are all known chemical substances. Z-HFO-1336mzzm, for example, may be manufactured using the method disclosed in the detailed description within US Published Patent Application 2008-0269532A1.

As acknowledged within the relevant technical field, an azeotrope composition is a mixture of two or more differing substances, which are in liquid format under given pressure conditions, and substantively boil at a specific temperature; wherein, said temperature is either higher or lower than the boiling temperature of the individual components and provides a vapor composition substantially the same as the overall liquid composition during boiling (For example, see M. F. Doherty and M. F. Malone, Conceptual Design of Distillation Systems, McGraw-Hill (New York), 2001, pp. 185-186, 351-359).

At this point, with the liquid composition within a range close to the azeotrope mixture liquid composition, if changed in various ways and measured to determine the vapor-liquid equilibrium relationship at fixed pressure, it is known that the boiling point of the azeotrope will be either maximized or minimized.

Accordingly, the substantial attributes of the azeotrope composition are that its boiling point under given pressure conditions as a liquid composition is fixed, and that during boiling, the composition of the upper vapor of the composition is substantively the composition of the liquid as a whole during boiling (in other words, the components of the liquid composition do not fractionate at all). It is also known within the relevant technical field that if the azeotrope composition is boiled at a different pressure, both the boiling point and the mass % of each component of the azeotrope composition may change. Accordingly, the azeotrope composition may be defined from the perspective of the particular relationship between the components, or from the perspective of the composition range of the components, or from the perspective of the accurate mass % of each component in the composition, depending on the fixed boiling point at the specified pressure.

In order to meet the objectives of the present invention, the azeotrope-like composition in the present invention is considered to behave like an azeotrope composition (in other words, it has fixed boiling point attributes and a tendency not to fractionate when boiling or evaporating). For this reason, during boiling or evaporation, even if the vapor-liquid composition changes, the changes are minimized or are of an extent that can be ignored. This is in contrast to a non-azeotrope-like composition, which undergoes significant changes to its vapor-liquid composition during boiling or evaporation.

Furthermore, the azeotrope-like composition in the present invention demonstrates a liquidus line and vapor line with no substantive temperature difference. In other words, the difference in values between the liquid temperature and gas temperature at the given pressure is small. In the present invention, it is believed that a composition demonstrating a maximum of 2° C. difference from the liquidus temperature (based on the minimum azeotrope point) is azeotrope-like.

Furthermore, if the relative volatility of a system approaches 1.0, the system is known within the field to be defined as forming either an azeotrope composition or an azeotrope-like composition. Relative volatility is the ratio of the volatility of component 1 to the volatility of component 2. The volatility of a component is calculated by finding the ratio of the molar fraction of a component in vapor to that in liquid.

The boiling point under atmospheric pressure of the azeotrope-like composition in the present invention, containing Z-HFO-1336mzzm and IPA, is preferably within the range 33.5° C.±2° C., or preferably ±1° C., and more preferably within the range of ±0.5° C., with a composition of Z-HFO-1336mzz:IPA=99.9-93 mass %:0.1-7 mass %, or preferably, Z-HFO-1336mzz:IPA=99.9-95 mass %:0.1-5 mass %, or more preferably, 99.9-97 mass %:0.1-3 mass %, or even more preferably, 99.9-98 mass %:0.1-2 mass %, or most preferably, 99.9-99 mass %:0.1-1 mass %.

The azeotrope-like composition in the present invention may include one or more nitroalkanes, epoxides, furans, benzotriazoles, phenols, amines or phosphates as a stabilizer, where required, and the composition volume in regard to the azeotrope-like composition is 0.01-5 wt %, preferably 0.05-0.5 wt %.

Additionally, the azeotrope-like composition in the present invention may, provided it is not detrimental to the attributes of the present invention, contain other components such as alcohols (other than IPA), ketones, ethers, esters, hydrocarbons, amines, glycol ethers or siloxanes, as required.

The azeotrope-like composition in the present invention has an ozone depletion potential (ODP) of 0, along with a global warming potential (GWP) roughly below 100, preferably below 50 and more preferably below 10. Here, ODP and GWP as applied to the present invention are defined in the Scientific Assessment of Ozone Depletion (2002), a report published by the World Meteorological Organization.

The azeotrope-like composition in the present invention can be used for a wide range of purposes in which halogenated hydrocarbons have conventionally been used, such as aerosol propellants, coolants, solvents, cleaning agents, particulate removal fluids, thermoplastic and thermosetting foam for foaming agents (foam expansion agents), heat transfer mediums, gaseous dielectrics, fire extinguishing agents and fire suppression agents, power cycle working fluids, polymerization mediums, carrier fluids, buffing abrasive agents, and displacement drying agents.

Among these, the azeotrope-like composition in the present invention is particularly suited for use as a cleaning agent (microscopic particle removal fluid) used for washing solid surfaces contaminated with organic or inorganic matter, such as semiconductor surfaces, electronic substrate surfaces, electronic circuits, CMOS (Complementary Metal Oxide Semiconductor), MEMS (Micro Electro Mechanical Systems), hard disk surfaces and other microstructures, and in particular, for washing semiconductor surfaces contaminated by microscopic particles.

Furthermore, the azeotrope-like composition in the present invention is also suitable for use as a coolant, for refrigeration purposes. In particular, since it has a boiling point in the range of 30-40° C., and demonstrates azeotrope characteristics, it is also particularly well suited for use as a coolant (ebullient cooling), using a cooling method that involves the process of condensing the azeotrope-like composition in the present invention, and evaporating it in the vicinity of a substance requiring cooling.

Additionally, the azeotrope-like composition in the present invention is particularly suited for use as a foaming agent (foam expansion agent) when manufacturing thermoplastic or thermosetting foam.

The following is a detailed description of the present invention in reference to the embodiments.

Examples

A mixture including Z-HFO-1336mzzm and IPA (Wako, Level 1) was measured to establish its boiling point, volume resistivity, viscosity, surface tension, density and flash point, using the following methods.

Boiling Point (Equilibrium Return Boiling Point)

The boiling point (equilibrium return boiling point) was measured using a cooling water temperature of 5° C., and heating performed with nothing between the hotplate and the flask, in accordance with JIS K 2233.

The results are given in FIG. 1. A minimized boiling point was demonstrated in the vicinity of IPA 0.5 mass %, and as such, it was confirmed that Z-HFO-1336mzzm and IPA demonstrate an azeotrope composition.

Volume Resistivity

Volume resistivity was measured using the non-resistant measuring device Digital Electronmeter 5415, manufactured by ADC Co., Ltd. A cell 1 ml in volume was used and a voltage of 50 V impressed, with the value measured 1 minute later. The ambient temperature during measurement was between 23-25° C., with humidity between 28-35%.

Figure 2:
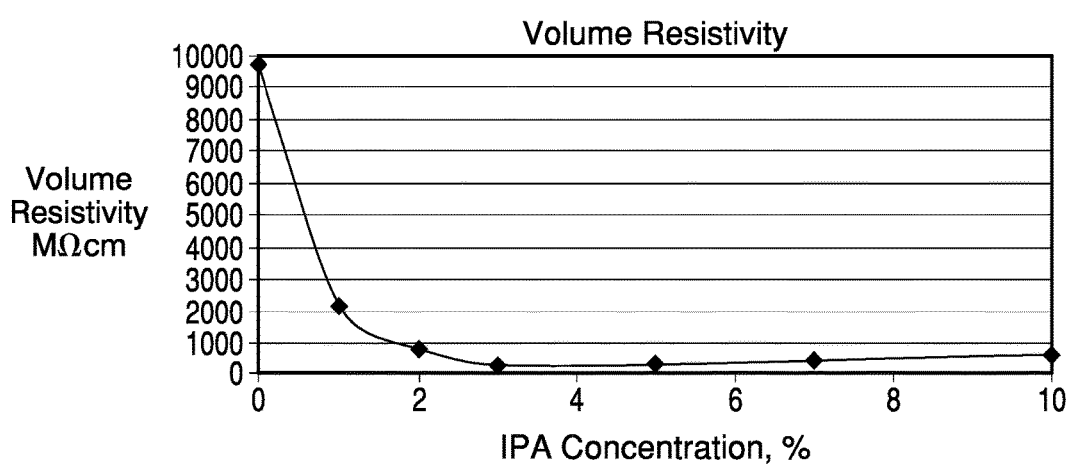
FIG. 2: depicts the volume resistivity of the mixture of Z-HFO-1336mzzm and IPA.

The results are given in FIG. 2. The addition of a small quantity of IPA significantly reduced the volume resistivity of Z-HFO-1336mzzm. Viscosity, surface tension, density The viscosity, surface tension and density of the mixture were calculated using the following formula.

$\sigma^{1/4} = [P](\rho_L - \rho_v)$ Surface tension: Macleod-Sugden correlation equation.

$\sigma$; Surface tension

P: Parachor coefficient $\rho_L$: Liquid specific gravity $\rho_v$: Vapor specific gravity MW: molecular weight The surface tension of Z-HFO-1336mzzm was 13.5 mN/m (set at USA NIST "REFPROP" calculation value, 25° C.).

$$|n\eta_m = \Sigma x_i f(\eta_i)| \quad \text{Viscosity: McAllister method}$$

η: Viscosity
x: Molar fraction
f(η): Viscosity logarithm

Z-HFO-1336mzzm viscosity was 0.39 mPa*s (set at USA NIST "REFPROP" calculation value, 25° C.), IPA viscosity was 2.08 mPa*s (using Solvent Pocketbook, Soc. Of Synthetic Organic Chemistry, 25° C. (midpoint between 20° C. and 30° C.)).

$$V_m = \Sigma x_j V_j \quad \text{Density: Amagat's law}$$

V: Density
x: Molar fraction

Density of Z-HFO-1336mzzm was 1.36 g/ml (set at USA NIST "REFPROP" calculation value, 25° C.), and the IPA density was 0.79 g/ml (using 25° C., Thermal properties of fluids, Japan Soc. Of Mechanical Engineers).

Flashpoint

Measurement of the flashpoint was carried out in accordance with JIS K 2265-1980, using the Tag closed and Cleveland open flashpoint tests.

The GWP, boiling point, volume resistivity, viscosity, surface tension, density and flashpoint of the azeotrope-like composition including 99 mass % Z-HFO-1336mzzm and 1 mass % IPA are shown in Table 1.

TABLE 1

|  | Z-1336mzzm/IPA (99/1) | Z-1336mzzm |
|---|---|---|
| GWP | <10 | <10 |
| Boiling point (° C.) | 33.4 | 33.5 |
| Volume Resistivity | 2229 | 5360 |
| Viscosity (mPa · s) | 0.41 | 0.39 |
| Surface tension (mN/m) | 13.6 | 13.5 |
| Density (g/ml) | 1.35 | 1.36 |
| Flashpoint (° C.) | N/A | N/A |

The inclusion of 1% IPA significantly reduces volume resistivity, in addition to significantly reducing surface tension, making the substance extremely suitable for use as a cleaning agent.

What is claimed is:

1. An azeotrope-like composition, comprising 93.0-99.9 mass % Z-1,1,1,4,4,4-hexafluoro-2-buteine and 0.1-7 mass % isopropanol.

2. A solid-surface cleaning agent, comprising the azeotrope-like composition according to claim 1.

3. The cleaning agent according to claim 2, wherein the solid-surface is a semiconductor surface.

4. A coolant, comprising the azeotrope-like composition according to claim 1.

5. A foaming agent, comprising the azeotrope-like composition according to claim 1.

* * * * *

UNITED STATES PATENT AND TRADEMARK OFFICE
CERTIFICATE OF CORRECTION

PATENT NO. : 10,421,846 B2
APPLICATION NO. : 15/777935
DATED : September 24, 2019
INVENTOR(S) : Hideaki Kikuchi and Takanori Matsumoto It is certified that error appears in the above-identified patent and that said Letters Patent is hereby corrected as shown below:

On the Title Page

Item (57) Right Column, "Abstract", 5 Lines down, cancel "Z-1,1,1,4,4,4-hexafluoro-2-buteine" and insert -- Z-1,1,1,4,4,4-hexafluoro-2-butene --

In the Specification

Column 1, Line 11, cancel "Z-1,1,1,4,4,4-hexafluoro-2-buteine" and insert -- Z-1,1,1,4,4,4-hexafluoro-2-butene --

Column 1, Line 52, cancel "Z-1,1,1,4,4,4-hexafluoro-2-buteine" and insert -- Z-1,1,1,4,4,4-hexafluoro-2-butene --

Column 1, Line 61, cancel "Z-1,1,1,4,4,4-hexafluoro-2-buteine" and insert -- Z-1,1,1,4,4,4-hexafluoro-2-butene --

Column 2, Line 36-37, cancel "Z-1,1,1,4,4,4-hexafluoro-2-buteine" and insert -- Z-1,1,1,4,4,4-hexafluoro-2-butene --

In the Claims

Column 6, Claim 1, Line 19, cancel "Z-1,1,1,4,4,4-hexafluoro-2-buteine" and insert -- Z-1,1,1,4,4,4-hexafluoro-2-butene --

Signed and Sealed this
Second Day of July, 2024

Katherine Kelly Vidal
*Director of the United States Patent and Trademark Office*